United States Patent
Kaizu et al.

(10) Patent No.: US 8,040,633 B2
(45) Date of Patent: Oct. 18, 2011

(54) MAGNETIC HEAD AND MAGNETIC RECORDING-REPRODUCING APPARATUS

(75) Inventors: Akimasa Kaizu, Tokyo (JP); Yoshikazu Soeno, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 979 days.

(21) Appl. No.: 12/000,283

(22) Filed: Dec. 11, 2007

(65) Prior Publication Data

US 2008/0144230 A1    Jun. 19, 2008

(30) Foreign Application Priority Data

Dec. 15, 2006 (JP) ................................. 2006-339227

(51) Int. Cl.
*G11B 5/82* (2006.01)
*G11B 5/127* (2006.01)
(52) U.S. Cl. ........................ 360/135; 360/319
(58) Field of Classification Search .................. 360/135, 360/125.3, 319, 123.12, 123.37, 123.58, 360/131
See application file for complete search history.

(56) References Cited

U.S. PATENT DOCUMENTS

| | | | | |
|---|---|---|---|---|
| 5,768,075 A * | 6/1998 | Bar-Gadda | ..... | 360/135 |
| 6,954,340 B2 * | 10/2005 | Shukh et al. | ..... | 360/317 |
| 7,322,095 B2 * | 1/2008 | Guan et al. | ..... | 29/603.07 |
| 7,450,349 B2 * | 11/2008 | Nishida et al. | ..... | 360/319 |
| 7,573,683 B1 * | 8/2009 | Benakli et al. | ..... | 360/319 |
| 7,719,793 B2 * | 5/2010 | Nikitin | ..... | 360/135 |
| 7,813,085 B2 * | 10/2010 | Anagawa et al. | ..... | 360/319 |
| 7,872,835 B2 * | 1/2011 | Guan | ..... | 360/319 |
| 2002/0109947 A1 * | 8/2002 | Khizroev et al. | ..... | 360/319 |
| 2005/0036223 A1 * | 2/2005 | Wachenschwanz et al. | ..... | 360/48 |
| 2005/0068678 A1 * | 3/2005 | Hsu et al. | ..... | 360/126 |
| 2005/0259354 A1 * | 11/2005 | Piramanayagam et al. | ..... | 360/125 |
| 2005/0259355 A1 * | 11/2005 | Gao et al. | ..... | 360/125 |
| 2006/0171068 A1 * | 8/2006 | Taguchi | ..... | 360/125 |
| 2008/0180861 A1 * | 7/2008 | Maruyama et al. | ..... | 360/319 |
| 2008/0253035 A1 * | 10/2008 | Han et al. | ..... | 360/319 |
| 2008/0273277 A1 * | 11/2008 | Guan et al. | ..... | 360/319 |
| 2009/0059438 A1 * | 3/2009 | Anagawa et al. | ..... | 360/319 |
| 2009/0091861 A1 * | 4/2009 | Takano et al. | ..... | 360/319 |
| 2011/0141616 A1 * | 6/2011 | Tagawa et al. | ..... | 360/75 |

FOREIGN PATENT DOCUMENTS

| JP | A 2002-359138 | 12/2002 |
|---|---|---|
| JP | A 2006-48860 | 2/2006 |
| JP | A 2006-134540 | 5/2006 |
| JP | A 2006-286085 | 10/2006 |

\* cited by examiner

*Primary Examiner* — Julie Anne Watko
(74) *Attorney, Agent, or Firm* — Oliff & Berridge, PLC (57) ABSTRACT

A magnetic recording-reproducing apparatus includes: a magnetic recording medium in which portions corresponding to track portions serve as recording areas and in which portions between the recording areas serve as non-recording areas; and a magnetic head having a main pole and a side shield disposed on both sides of the main pole in a cross-track direction. In the magnetic recording-reproducing apparatus, following inequality (I) is satisfied:

$$S > Tw/2 + Gw \quad\quad (I)$$

where Tw is a track width, Gw is a gap width, and S is a distance between the center of the main pole of the magnetic head and an edge on the main pole side of each of the side shields.

9 Claims, 6 Drawing Sheets

MAGNETIC HEAD AND MAGNETIC RECORDING-REPRODUCING APPARATUS

BACKGROUND OF THE INVENTION

1. Field of the Invention

The present invention relates to a magnetic head for recording data on a magnetic recording medium in which portions corresponding to track portions or parts thereof serve as recording areas having a width substantially the same as a track width and in which portions between the recording areas serve as non-recording areas. The invention also relates to a magnetic recording-reproducing apparatus provided with the magnetic recording medium and the magnetic head.

2. Description of the Related Art

A significant improvement in the areal density of conventional magnetic recording media such as hard disks has been achieved by, for example, reducing the size of magnetic particles constituting a recording layer, changing materials, and improving the precision of head processing. Also, magnetic recording media of a perpendicular recording-type are becoming practical. In this type of magnetic recording media, the areal density is improved by providing a recording layer that is to be magnetized in a direction perpendicular to its surface and a soft magnetic layer below the recording layer. Hence, a further improvement in the areal density is expected in the future.

However, problems such as recording of data on an incorrect track portion adjacent to a target track portion and crosstalk during reproduction, which are caused by the limit of head processing and magnetic field broadening, have become apparent. Hence, the improvement of the areal density by conventional improvement techniques has reached its limit.

As the areal density increases, the track width decreases. However, it has been suggested that the magnitude of a magnetic field leaking from a recording head in the cross-track direction is not reduced even when the width of the recording head is reduced along with the reduction in the track width. Therefore, as the areal density increases, a magnetic signal is more likely to be recorded incorrectly on a track portion adjacent to a target recording track portion.

In view of the above, a number of magnetic recording media have been proposed as candidates for a magnetic recording medium capable of realizing a further improvement in the areal density. In such magnetic recording media, portions corresponding to track portions or parts thereof serve as recording areas having a width that is substantially the same as the track width, and portions between the recording areas serve as non-recording areas.

For example, magnetic recording media such as discrete track media and patterned media have been proposed (see for example, Japanese Patent Application Laid-Open No. 2006-048860). In discrete track media, a recording layer is formed in a concavo-convex pattern corresponding to a track pattern, and convex portions of the recording layer are each formed in the shape of a track portion. Hence, the shape of each recording area corresponds to the shape of a track portion. In patterned media, convex portions of a recording layer are each formed in a shape formed by circumferentially dividing up a track portion, and hence the shape of each recording area is the shape formed by circumferentially dividing up a track portion.

Moreover, other magnetic recording media have been proposed in, for example, Japanese Patent Application Laid-Open Nos. 2006-286085 and 2002-359138. Specifically, for example, ion injection treatment or treatment using a reaction gas is performed on portions corresponding to either recording areas or non-recording areas in a recording layer in order to form the non-recording areas in which the saturation magnetization is made to substantially disappear and the recording areas in which the saturation magnetization remains.

It is expected that the presence of non-recording areas between recording areas, as described above, suppresses incorrect recording of information on a track portion adjacent to a target recording track portion, crosstalk between adjacent track portions, and the like.

However, problems such as incorrect recording of magnetic signals on a track portion adjacent to a target recording track portion are affected not only by the configuration of a magnetic recording medium, such as the shape of recording areas formed in track portions, but also by the configuration of a magnetic head. Hence, problems such as incorrect recording of magnetic signals on a track portion adjacent to a target recording track portion may occur even in a magnetic recording medium in which portions corresponding to track portions or parts thereof serve as recording areas and in which portions between the recording areas serve as non-recording areas.

SUMMARY OF THE INVENTION

In view of the foregoing problems, various exemplary embodiments of this invention provide a magnetic head capable of reliably recording a magnetic signal only on a target recording track portion in a magnetic recording medium in which portions corresponding to track portions or parts thereof serve as recording areas having a width substantially the same as the track width and in which portions between the recording areas serve as non-recording areas. It is another object of the invention to provide a magnetic recording-reproducing apparatus provided with the magnetic recording medium and the magnetic head.

In the course of arriving at the present invention, the present inventors first attempted to dispose a side shield on both sides of a main pole of a magnetic head in a cross-track direction. This was because it was conceivable that the flow of a recording magnetic field from the main pole placed above a target recording track portion to adjacent track portions would be shielded by disposing the side shields, whereby the recording magnetic field could be applied only to the target recording track portion.

However, even when the side shields were disposed in the above manner, the flow of a recording magnetic field to track portions adjacent to a target recording track portion was not always satisfactorily suppressed. Rather, in some cases, the recording magnetic field applied to track portions adjacent to a target recording track portion was increased when compared with that of the case in which the side shields were not provided.

In order to elucidate the cause of the above problem, the inventors conducted further intensive studies and found that the cause was that the disposed positions of the side shields were too close to the main pole. More specifically, in the case where the center of the main pole of the magnetic head in the cross-track direction is located directly above the center of a target recording track portion in the cross-track direction, the inventors found the following. When the edge on the main pole side of each of the side shields is located above or on the main pole side of the edge on the main pole side of a track portion adjacent to the target recording track portion, the recording magnetic field applied to the adjacent track portion is not sufficiently suppressed. Rather, the recording magnetic field applied to the adjacent track portion can increase when compared to that of the case where the side shields are not provided.

The mechanism of the above phenomenon is not clear. However, it can be presumed that when the disposed positions of the side shields are too close to the main pole, the ratio of the recording magnetic field flowing from the main pole to the side shields becomes excessively large. Therefore, the recording magnetic field can flow through the side shields toward track portions adjacent to a target recording track portion.

In view of the above, the present inventors have found that when the edge on the main pole side of each of the side shields is located at a position further away from the main pole than the position directly above the edge on the main pole side of a track portion adjacent to a target recording track portion, the effect of suppressing the recording magnetic field applied to the adjacent track portion can be reliably obtained.

Specifically, the inventors have found that the recording magnetic field applied to track portions adjacent to a target recording track portion is sufficiently suppressed when the following inequality is satisfied:

$$S > Tw/2 + Gw \qquad (I)$$

where Tw is a track width, Gw is a gap width, and S is a distance in the cross-track direction between the center of the main pole in the cross-track direction and the edge on the main pole side of each of the side shields.

Accordingly, various exemplary embodiments of this invention provide a magnetic recording-reproducing apparatus comprising: a magnetic recording medium having a track pattern formed by arranging track portions having a predetermined track width and gap portions having a predetermined gap width alternately in a cross-track direction, in which at least a part of portions corresponding to the track portions in the track pattern serve as recording areas having a width substantially the same as the track width, and in which portions between the recording areas serve as non-recording areas; and a magnetic head having a main pole for applying a recording magnetic field to the recording areas, and a side shield disposed on both sides of the main pole in the cross-track direction wherein following inequality (I):

$$S > Tw/2 + Gw \qquad (I)$$

is satisfied, where Tw is the track width, Gw is the gap width, and S is a distance in the cross-track direction between the center of the main pole of the magnetic head in the cross-track direction and an edge on the main pole side of the side shield.

Moreover, various exemplary embodiments of this invention provide a magnetic head used for a magnetic recording medium which has a track pattern formed by arranging track portions having a predetermined track width and gap portions having a predetermined gap width alternately in a cross-track direction, in which at least a part of portions corresponding to the track portions in the track pattern serve as recording areas having a width substantially the same as the track width, and in which portions between the recording areas serve as non-recording areas, the magnetic head comprising: a main pole for applying a recording magnetic field to the recording areas; and a side shield disposed on both sides of the main pole in the cross-track direction, wherein following inequality (I):

$$S > Tw/2 + Gw \qquad (I)$$

is satisfied, where Tw is the track width, Gw is the gap width, and S is a distance in the cross-track direction between the center of the main pole in the cross-track direction and an edge on the main pole side of the side shield.

In the present application, the expression "the track pattern formed by arranging track portions having a predetermined track width and gap portions having a predetermined gap width alternately in a cross-track direction" is used to include a track pattern in which the track portions have concentric circular or arc shapes and a track pattern in which the track portions constitute a spiral shape.

Furthermore, in the present application, the expression "at least parts of portions corresponding to the track portions serve as the recording areas having a width substantially the same as the track width" is used to include: a case where the entire track portions serve as the recording areas and the shape of each of the recording areas corresponds to the shape of the corresponding track portion; and a case where parts of the track portions serve as the recording areas and the shape of each of the recording areas is a shape formed by circumferentially dividing up the corresponding track portion. When each of the recording areas has the shape formed by circumferentially dividing up the corresponding track portion, not only portions corresponding to the gap portions of the track pattern but also portions between the circumferentially divided up recording areas in each of the track portions serve as the non-recording areas.

Moreover, in the present application, the term "cross-track direction" is used to refer to a direction that is substantially parallel to the track width direction and the gap width direction.

Furthermore, in the present application, the term "recording area" is used to refer to an area in which the magnetization can be reversed by applying a recording magnetic field and which has the ability to retain a recorded magnetic signal in a manner where the signal can be reproduced.

Moreover, in the present application, the term "non-recording area" is used to refer to an area in which the ability to retain a magnetic signal is lower than that of the recording areas or an area which does not substantially have the ability to retain a magnetic signal in a manner where the signal can be reproduced. More specifically, the non-recording area refers to an area in which, in a state where magnetic signals are recorded in a magnetic recording medium, the magnetic field generated from this area is smaller than the magnetic field generated from the recording areas or to an area in which the magnetic field generated from this area is substantially absent. Furthermore, the non-recording areas may be formed by separating the recording areas with a non-magnetic material or by separating the recording areas with a material that is magnetically affected to a negligible extent or with a magnetic material that has the ability to retain a magnetic signal that is lower than that of the recording areas. Moreover, the non-recording areas may be a gap (empty).

Further to this, in the present application, the term "a magnetic recording medium" is not limited to a medium, such as hard disk and floppy (registered trademark) disk, in which magnetism alone is used for recording and reproducing magnetic signals. This term is also used to refer to a magneto-optical recording medium, such as MO disk, in which both magnetism and light are used and to heat assisted type recording medium in which both magnetism and heat are used.

In inequalities (I), (II), (III), (IV), and (V) in the present application, the unit of each of Tw, Gw, and S is nm.

According to various exemplary embodiments of the present invention, a magnetic head capable of reliably recording a magnetic signal only on a target recording area in a magnetic recording medium in which portions corresponding to track portions or parts thereof serve as recording areas having a width that is substantially the same as the track width and in which portions between the recording areas serve as non-recording areas can be realized. In addition to this, a magnetic recording-reproducing apparatus provided with the magnetic recording medium and the magnetic head can be realized.

DETAILED DESCRIPTION OF THE PREFERRED EMBODIMENTS

Hereinafter, preferred exemplary embodiments of the present invention will be described in detail with reference to the accompanying drawings.

Figure 1:
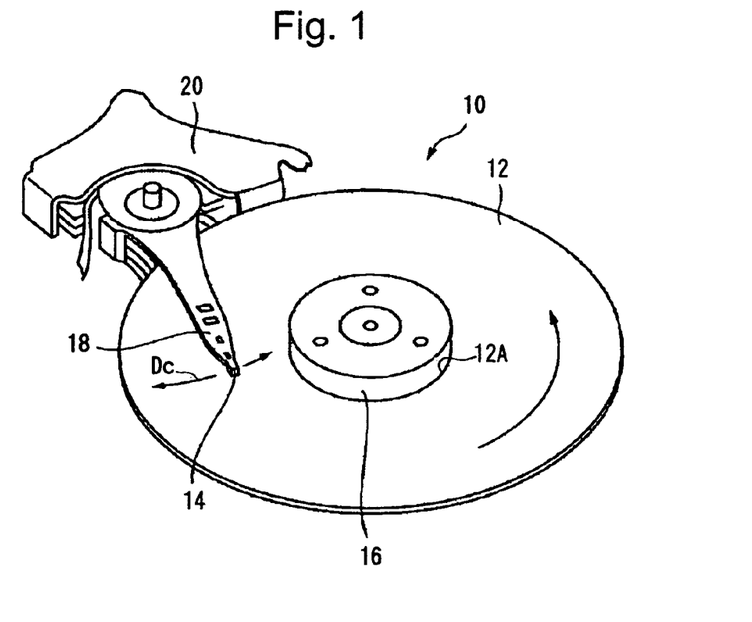
FIG. 1 is a perspective view schematically illustrating the general structure of a magnetic recording-reproducing apparatus according to an exemplary embodiment of the present invention.

As shown in FIG. 1, a magnetic recording-reproducing apparatus 10 according to one exemplary embodiment of the present invention includes: a magnetic recording medium 12; and a magnetic head 14 disposed so as to be capable of flying in close proximity to the surface of the magnetic recording medium 12 in order to record and reproduce magnetic signals on/from the magnetic recording medium 12.

The magnetic recording medium 12 has a center hole 12A and is secured to a chuck 16 through the center hole 12A. The magnetic recording medium 12 is rotatable together with the chuck 16. The magnetic head 14 is attached near the end of an arm 18, and the arm 18 is rotatably attached to a base 20. Hence, the magnetic head 14 can move along an arc-shaped trajectory in the radial direction of the magnetic recording medium 12 while being located in close proximity to the surface of the magnetic recording medium 12.

Figure 2:
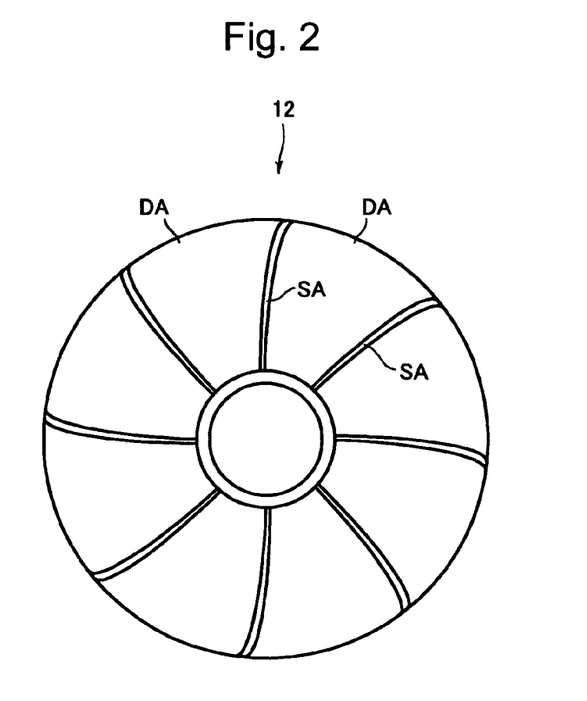
FIG. 2 is a plan view schematically illustrating the general structure of a magnetic recording medium of the magnetic recording-reproducing apparatus.

The magnetic recording medium 12 is a substantially disk-shaped discrete track medium of a perpendicular recording type. As shown in FIG. 2, the magnetic recording medium 12 is sectioned into a plurality of servo areas SA provided at suitable intervals in the circumferential direction and a plurality of data areas DA that are partitioned by the servo areas SA. A track pattern in each of the data areas DA is a pattern in which concentric arc-shaped track portions having a predetermined track width Tw and gap portions having a predetermined gap width Gw are alternately arranged in a cross-track direction Dc.

Figure 3:
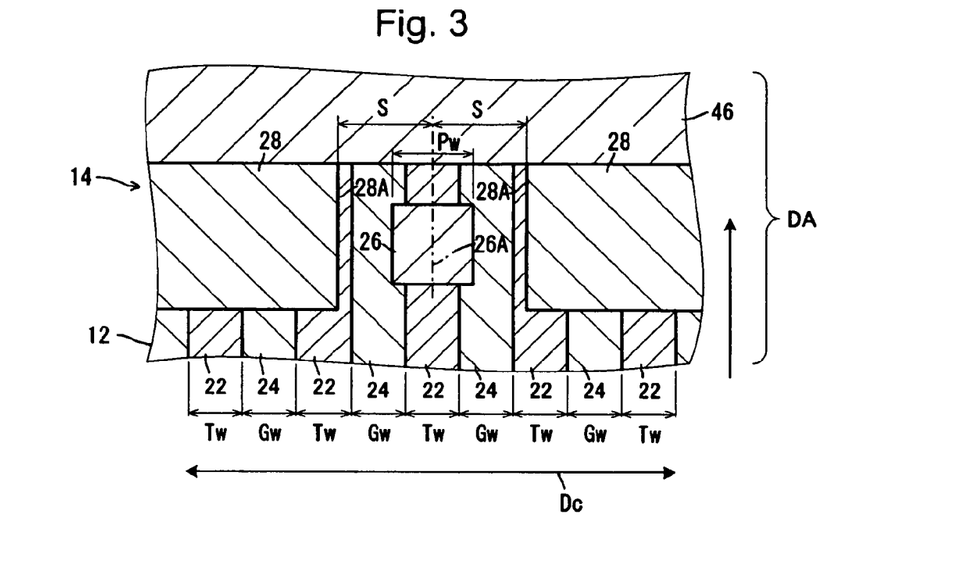
FIG. 3 is an enlarged plan view schematically illustrating the structures of a magnetic head and the magnetic recording medium of the magnetic recording-reproducing apparatus.
Figure 4:
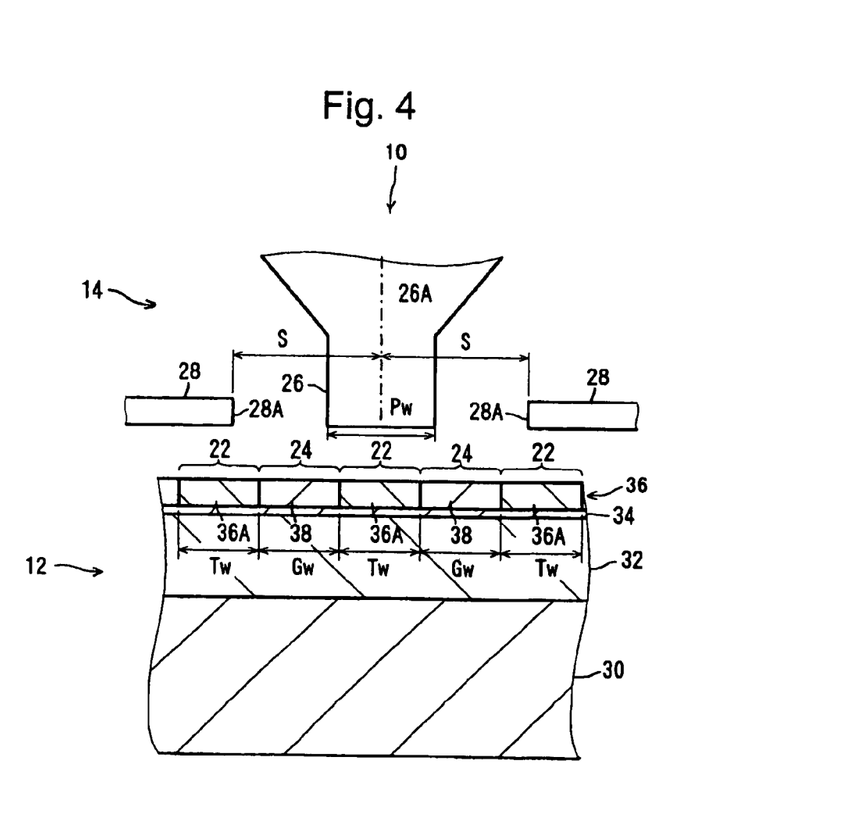
FIG. 4 is an enlarged cross-sectional side view along the cross-track direction, schematically illustrating the structures of the magnetic head and the magnetic recording medium.

As shown in FIGS. 3 and 4, in the magnetic recording medium 12, a portion corresponding to each of the track portions serves as a recording area 22, and a portion corresponding to each of the gap portions between the recording areas 22 serves as a non-recording area 24 for magnetically isolating the recording areas 22 from one another. The track width Tw is in the range of 10 to 200 nm. In addition to this, the gap width Gw is also in the range of 10 to 200 nm.

The magnetic head 14 has: a main pole 26 for applying a recording magnetic field to the recording area 22; and a side shield 28 disposed on both sides in the cross-track direction Dc (the radial direction of the magnetic recording medium 12) of the main pole 26.

In the magnetic recording-reproducing apparatus 10, the following inequality (I) is satisfied:

$$S > Tw/2 + Gw \quad (I)$$

where S is the distance in the cross-track direction Dc between the center 26A of the main pole 26 of the magnetic head 14 in the cross-track direction Dc and an edge 28A on the main pole 26 side of each of the side shields 28.

In addition to this, in the magnetic recording-reproducing apparatus 10, the following inequality (II) is satisfied:

$$S \leq 4/3 \times (Tw/2 + Gw) + 300 \text{ nm} \quad (II).$$

A description of the configuration of other components is omitted as appropriate because it does not seem important in order to gain an understanding of the present exemplary embodiment.

The magnetic recording medium 12 has a substrate 30, a soft magnetic layer 32, a seed layer 34, and a recording layer 36, and these layers are formed over the substrate 30 in that order.

The surface on the recording layer 36 side of the substrate 30 is polished to a mirror finish. The material forming the substrate 30 may be a non-magnetic material such as glass, an Al alloy coated with NiP, Si, or $Al_2O_3$.

The soft magnetic layer 32 has a thickness in the range of 50 to 300 nm, and both the surfaces thereof are substantially flat. The material forming the soft magnetic layer 32 may be an Fe alloy, a Co amorphous alloy, ferrite, or the like. Furthermore, the soft magnetic layer 32 may have a stacked structure of a soft magnetic layer and a non-magnetic layer.

The seed layer 34 has a thickness of 2 to 40 nm. The material forming the seed layer 34 may be a nonmagnetic material such as a CoCr alloy, Ti, Ru, a stacked body of Ru and Ta, or MgO.

In each of the data areas DA, the recording layer 36 is formed in a concavo-convex pattern corresponding to a track pattern. In this case, each convex portion in the concavo-convex pattern serves as a recording element 36A, and an area in which the convex portion is formed serves as the recording area 22. On the other hand, each area in which a concave portion in the concavo-convex pattern is formed serves as the non-recording area 24. Specifically, the recording layer 36 is divided into a large number of the recording elements 36A. Furthermore, in each of the data areas DA, the shape of each of the recording elements 36A corresponds to the shape of the corresponding track portion. FIGS. 3 and 4 illustrate the configuration of the recording layer 36 described above. It is noted that the recording layer 36 is formed in a predetermined servo pattern in each of the servo areas SA (not shown).

The recording layer 36 has a thickness in the range of 5 to 40 nm. Preferably, the saturation magnetization Bs of the recording layer 36 is in the range of 0.38 to 1.0 T. Moreover, preferably, the coercivity Hc in the thickness direction of the recording layer 36 is in the range of 275 to 560 kA/m. The material forming the recording layer 36 can be an alloy containing Co and Cr, such as a CoCrPt alloy, an alloy containing Co and Pt, an alloy containing Co and Pd, an alloy containing Fe and Pt, an alloy containing Fe and Co, a stacked body thereof, a material formed of an oxide material, such as $SiO_2$, and ferromagnetic particles, such as CoPt, contained in the oxide material in a matrix form, or the like. The recording layer 36 is oriented so as to be magnetized in a direction that is perpendicular to the surface of the magnetic recording medium 12.

It is noted that the side surfaces of each of the recording elements 36A may be inclined and tapered toward the surface of the magnetic recording medium 12. In this case, each of both the track width Tw, and the gap width Gw is a width at a position on the upper surface of the recording layer 36.

Meanwhile, each concave portion between the recording elements 36A which corresponds to the gap portion is filled with a filler material 38, and the upper surfaces of the recording elements 36A and the filler material 38 are substantially flat. The filler material 38 having the shape of the gap portion constitutes each of the non-recording areas 24. The material forming the filler material 38 may be an oxide such as $SiO_2$, $Al_2O_3$, $TiO_2$, MgO, $ZrO_2$, or ferrite, a nitride such as AlN, a carbide such as SiC, C (carbon), a non-magnetic metal such as Cu or Cr, a resin material, or the like.

A protection layer and a lubrication layer may be formed in that order over the recording layer 36 and the filler material 38. However, the description of these layers is omitted because it does not seem important in order to gain an understanding of the present exemplary embodiment, and these layers are not shown in the drawings.

Furthermore, an underlayer and an antiferromagnetic layer may be formed between the substrate 30 and the soft magnetic layer 32. However, the description of these layers is also omitted because it does not seem important in order to gain an understanding of the present exemplary embodiment, and these layers are also not shown in the drawings.

Figure 5:
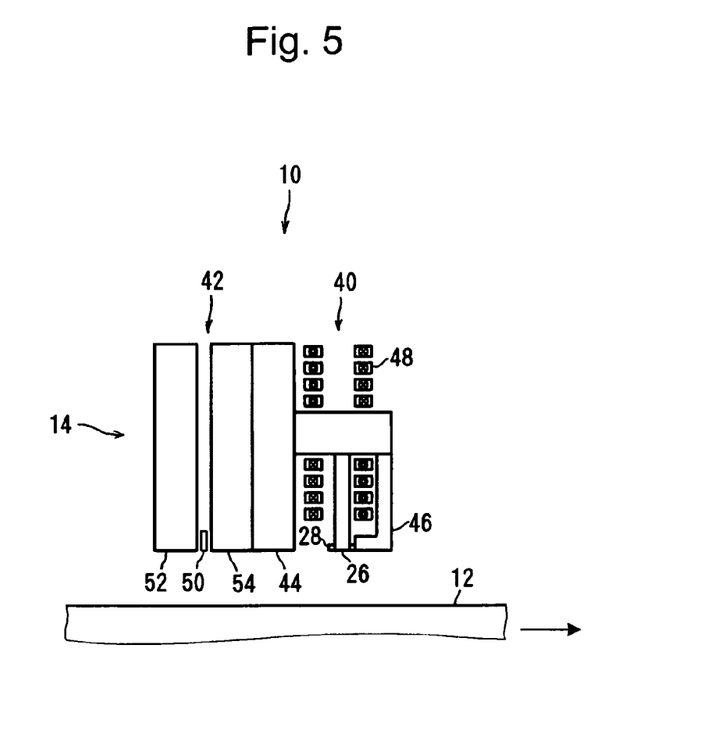
FIG. 5 is an enlarged cross-sectional side view along the circumferential direction of a track portion, schematically illustrating the structures of the magnetic head and the magnetic recording medium.

As shown in FIG. 5, the magnetic head 14 has a recording head portion 40 and a reproducing head portion 42, and the main pole 26 and the side shields 28 constitute parts of the recording head portion 40.

The recording head portion 40 further includes: an auxiliary magnetic pole 44 disposed on the front side (being the front side in the traveling direction of the magnetic head 14 relative to the driven magnetic recording medium 12) of the main pole 26; a trailing shield 46 disposed on the rear side (being the rear side in the traveling direction of the magnetic head 14 relative to the driven magnetic recording medium 12) of the main pole 26; and an exciting coil 48. Each of the right arrow in FIG. 5 and the upward arrow in FIG. 3 represents the traveling direction of the magnetic recording medium 12.

The reproducing head portion 42 is disposed on the front side of the recording head portion 40. The reproducing head portion 42 includes: an MR element 50; a leading shield 52 disposed on the front side of the MR element 50; and an intermediate shield 54 disposed between the MR element 50 and the auxiliary magnetic pole 44.

When viewed along the circumferential direction of the track portions, the main pole 26 has a shape in which the end portion in close proximity to the magnetic recording medium 12 is narrower than the base end portion. The main pole width Pw in the cross-track direction Dc of the end of the main pole 26 is approximately Tw/2 to approximately 2 Tw, and preferably approximately 3 Tw/4 to approximately 3 Tw/2. Furthermore, the main pole width Pw is in the range of 0.3 Tp to 1.2 Tp, and preferably in the range of 0.6 Tp to 1.0 Tp, where Tp is a track pitch and Tp=Tw+Gw. Preferably, the material for the main pole 26 has a saturation magnetization Bs in the range of 1.8 to 2.3 T. Furthermore, the material for the main pole 26 is a soft magnetic material, and the coercive force Hc thereof is preferably in the range of 0.1 to 800 A/m. The material forming the main pole 26 may be an alloy containing Co, an alloy containing Fe, an alloy containing Fe and Co, an alloy containing Fe and Ni, an alloy containing Fe and N, an alloy containing Fe and Al, or the like. The magnetic gap between the lower surface of the main pole 26 and the upper surface of the recording layer 36 is in the range of 3 to 30 nm.

It is noted that FIG. 3 shows a cross-section of the magnetic head 14 near the end of the main pole 26 and schematically shows the outside shapes of the main pole 26 and the side shields 28 when viewed from a direction perpendicular to the surface of the magnetic recording medium 12. Furthermore, in FIG. 3, the hatchings on the magnetic recording medium 12 are used to distinguish between the recording areas 22 and the non-recording areas 24 and do not represent a cross-section. In FIG. 3, the end of the main pole 26 has a rectangular shape when viewed from a direction perpendicular to the surface of the magnetic recording medium 12. However, the end of the main pole 26 may have a substantially trapezoidal shape in which the rear side edge is longer than the front side edge. In this case, the above-described main pole width Pw (being the width of the end of the main pole 26) is the maximum width (being the width of the longer rear side edge).

The length of each of the side shields 28 in the circumferential direction of the track portions is 1.1 to 2 times the length of the main pole 26 in the circumferential direction of the track portions. The edges 28A of the main pole 26 side are substantially parallel to the circumferential direction of the track portions. That is, the edges 28A are substantially perpendicular to the cross-track direction Dc. Moreover, each of the side shields 28 has a thickness (being a thickness in a direction perpendicular to the surface of the magnetic recording medium 12) in the range of 50 nm to 1 μm. Furthermore, the height of the lower surface of each of the side shields 28 is substantially the same as the height of the lower surface of the main pole 26. The saturation magnetization Bs of the material for the side shields 28 is preferably in the range of 0.7 to 2.3 T. Moreover, the material for the side shields 28 is a soft magnetic material, and the coercive force Hc thereof is preferably in the range of 0.1 to 800 A/m. The material forming the side shields 28 may be an alloy containing Co, an alloy containing Fe, an alloy containing Fe and Co, an alloy containing Fe and Ni, an alloy containing Fe and N, an alloy containing Fe and Al, or the like, as is the case for the material forming the main pole 26.

A description will now be given of the action of the magnetic recording-reproducing apparatus 10.

In the magnetic recording-reproducing apparatus 10, the track width Tw, the gap width Gw, and the distance S between the center 26A of the main pole 26 of the magnetic head 14 and the edge 28A on the main pole 26 side of each of the side shields 28 satisfy the above inequality (I).

Specifically, when the center of the main pole 26 of the magnetic head 14 in the cross-track direction Dc is located directly above the center of a target recording track portion in the cross-track direction Dc, the edge 28A on the main pole 26 side of each of the side shields 28 is located further away from the main pole 26 than the edge on the main pole 26 side of a track portion adjacent to the target recording track portion (being a recording area 22).

Therefore, the effect of suppressing the recording magnetic field applied to a track portion adjacent to a target recording track portion can be obtained more reliably than in the case where the side shields are absent.

Moreover, in the magnetic recording-reproducing apparatus 10, Tw, Gw, and S satisfy the above inequality (II). Hence, the effect of suppressing the recording magnetic field applied to a track portion adjacent to a target recording track portion can be obtained in contrast to the case where the side shields are absent.

In order to enhance the effect of suppressing the recording magnetic field applied to a track portion adjacent to a target recording track portion when compared with the case where the side shields are absent, it is preferable that Tw, Gw, and S satisfy the following inequality (III):

$$S \leq 4/3 \times (Tw/2 + Gw) + 100 \text{ nm} \quad \text{(III)}.$$

Moreover, in order to further enhance the effect of suppressing the recording magnetic field applied to a track portion adjacent to a target recording track portion when compared with the case where the side shields are absent, it is preferable that Tw, Gw, and S satisfy the following inequality (IV):

$$S \geq 0.6 \times Tw + Gw \quad \text{(IV)}.$$

It is more preferable that Tw, Gw, and S satisfy the following inequality (V):

$$S > 0.6 \times Tw + 1.1 \times Gw \quad \text{(V)}.$$

The basis of inequalities (I), (II), (III), (IV), and (V) are described later in the sections describing the simulation examples.

In the above exemplary embodiment, oxides such as $SiO_2$, $Al_2O_3$, $TiO_2$, MgO, $ZrO_2$, and ferrite, nitrides such as AlN, carbides such as SiC, C (carbon), non-magnetic metals such as Cu or Cr, resin materials, and the like are examples of materials that can be used as the filler material 38. However, no particular limitation is imposed on the material used as the filler material 38. Any material can be used so long as it is chemically stable and has a lower ability to retain a magnetic signal than the recording areas or so long as it does not substantially have the ability to retain a magnetic signal in a manner where the signal can be reproduced. For example, the material forming the filler material 38 may be another non-magnetic material or a magnetic material having a lower ability to retain a magnetic signal than the recording areas to the extent that its magnetic influence is negligible.

Furthermore, in the above exemplary embodiment, the filler material 38 is filled in each of the non-recording areas 24. However, portions corresponding to either the recording areas or the non-recording areas in the recording layer may be subjected to ion injection treatment or treatment with a reaction gas to thereby form the non-recording areas having substantially no saturation magnetization and the recording areas having saturation magnetization.

Moreover, in the above exemplary embodiment, the non-recording areas 24 are filled with the filler material 38, and therefore the surface of the magnetic recording medium 12 is substantially flat. However, so long as a stable head flying height can be obtained even when the surface of the magnetic recording medium 12 assumes the concavo-convex pattern of the recording layer 36 or a pattern following the concavo-convex pattern, the non-recording areas 24 may not be filled with the filler material 38 and the concave portions may serve as the non-recording areas 24.

Furthermore, in the above exemplary embodiment, the magnetic recording medium 12 is of a single-side recording type in which the recording layer 36 is formed on one side of the substrate 30. However, the present invention is also applicable to a magnetic recording medium of a double-side recording type in which the recording layer is formed on both sides of a substrate.

Moreover, in the above exemplary embodiment, the magnetic recording medium 12 is of a perpendicular recording type. However, the present invention is also applicable to a magnetic recording medium of a longitudinal recording type. In the case of the longitudinal recording type, it is not necessary to form a soft magnetic layer below the recording layer.

Furthermore, in the above exemplary embodiment, the magnetic recording medium 12 is a discrete track medium in which the shape of each of the recording areas 22 corresponds to the shape of the corresponding track portion. However, the present invention is also applicable to a patterned medium in which each of the recording areas 22 has a shape formed by dividing up a track portion in the circumferential direction.

Moreover, in the above exemplary embodiment, the track pattern of the magnetic recording medium 12 is formed by the track portions having concentric arc shapes. However, of course, the present invention is also applicable to a magnetic recording medium having a track pattern in which track portions constitute a spiral shape.

Figure 6:
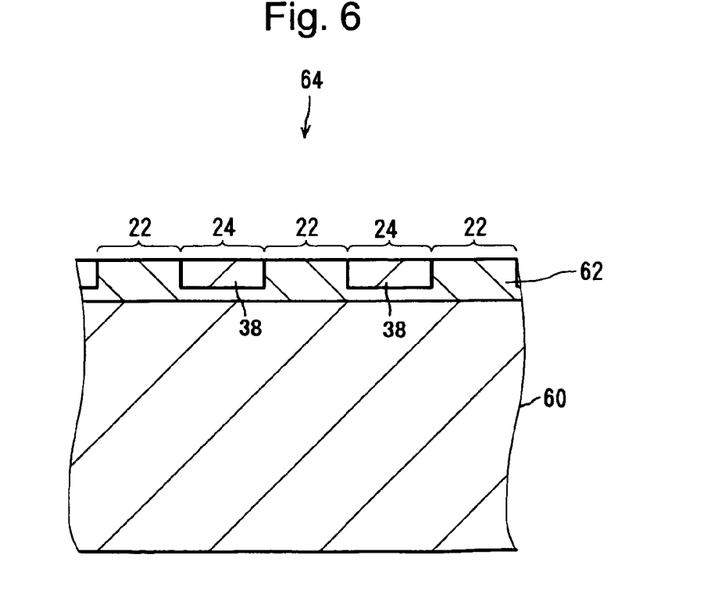
FIG. 6 is a cross-sectional side view along the cross-track direction, schematically illustrating another example of the structure of the magnetic recording medium of the exemplary embodiment of the present invention.
Figure 7:
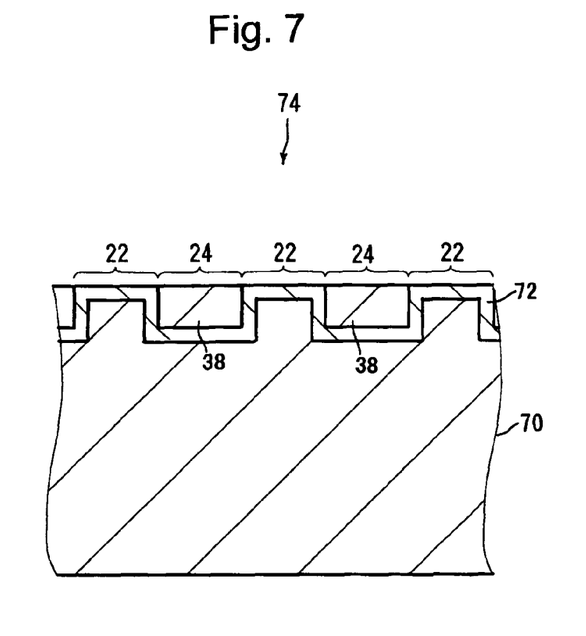
FIG. 7 is a cross-sectional side view along the cross-track direction, schematically illustrating another example of the structure of the magnetic recording medium of the exemplary embodiment of the present invention.
Figure 8:
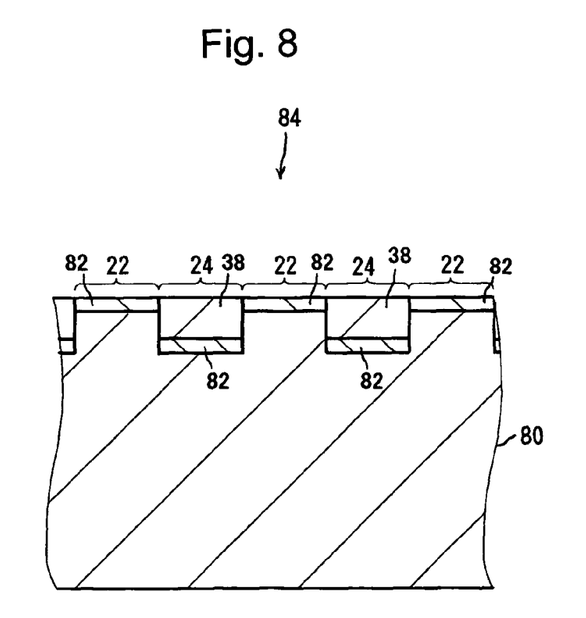
FIG. 8 is a cross-sectional side view along the cross-track direction, schematically illustrating another example of the structure of the magnetic recording medium of the exemplary embodiment of the present invention.

In addition, in the above exemplary embodiment, the recording layer 36 is divided into a large number of the recording elements 36A. However, of course, the present invention is also applicable to a magnetic recording medium 64 having a recording layer 62 formed into the concavo-convex pattern as shown in FIG. 6. In this concavo-convex pattern, the lower portion of the recording layer 62 on a substrate 60 side is continuous, and the upper surface of each of the non-recording areas 24 is recessed from the upper surface of each of the recording areas 22 toward the substrate 60 side. Also, the present invention is applicable to a magnetic recording medium 74 having a continuous recording layer 72 which is formed so as to follow the surface of the concavo-convex pattern of a substrate 70, as shown in FIG. 7. Moreover, the present invention is applicable to a magnetic recording medium 84 having a recording layer 82 which is formed on the upper surface of each convex portion in the surface of the concavo-convex pattern of a substrate 80 and on the upper surface of each concave portion in a divided manner, as shown in FIG. 8. In addition, the present invention is also applicable to a magnetic recording medium formed by subjecting portions corresponding to either recording areas or non-recording areas in the recording layer to ion injection treatment or treatment with a reaction gas. In this manner, the non-recording areas having substantially no saturation magnetization and the recording areas having saturation magnetization are formed.

Simulation Example 1

Three simulation models A, B, and C were produced in which the track width Tw, the gap width Gw, the main pole width Pw in the above exemplary embodiment were set to values shown in Table 1.

TABLE 1

| Simulation model | | Tw (nm) | Gw (nm) | Pw (nm) | Tw + Gw (nm) | Pw/ (Tw + Gw) | Pw/ Tw |
|---|---|---|---|---|---|---|---|
| 1 | A | 50 | 50 | 70 | 100 | 0.70 | 1.40 |
|   | B | 100 | 100 | 130 | 200 | 0.65 | 1.30 |
|   | C | 150 | 150 | 200 | 300 | 0.67 | 1.33 |
| 2 | D | 100 | 100 | 240 | 200 | 1.20 | 2.40 |
|   | E | 100 | 100 | 70 | 200 | 0.35 | 0.70 |
| 3 | F | 120 | 80 | 130 | 200 | 0.65 | 1.08 |
|   | G | 80 | 120 | 130 | 200 | 0.65 | 1.63 |

The other conditions were set as listed below. These conditions were common for the simulation models A, B, and C.

The saturation magnetization Bs of the recording layer 36: 0.5 T

The saturation magnetization Bs of the main pole 26: 2.3 T

The saturation magnetization Bs of the side shields 28: 1.1 T

The magnetic gap: 10 nm

The thickness of the side shields 28: 250 nm

In addition to this, the center 26A of the main pole 26 in the cross-track direction Dc was aligned so as to be located directly above the center of a target recording area 22 in the cross-track direction Dc.

For each of these simulation models A, B, and C, simulations were performed by setting to a plurality of different values the distance S between the center 26A of the main pole 26 of the magnetic head 14 and the edge 28A on the main pole 26 side of each of the side shields 28. Then, the magnitude of the magnetic field applied to the edge on the main pole 26 side of a track portion adjacent to a target recording track portion (being a track portion directly below the main pole 26) was calculated. The relationship between the distance S and the magnitude of the magnetic field applied to the edge on the main pole 26 side of the track portion adjacent to the target recording track portion is shown in Table 2 and FIG. 9.

TABLE 2

| A | | B | | C | |
|---|---|---|---|---|---|
| Distance S between center of main pole and edge of side shield (nm) | Recording magnetic field at edge of adjacent track portion | Distance S between center of main pole and edge of side shield (nm) | Recording magnetic field at edge of adjacent track portion | Distance S between center of main pole and edge of side shield (nm) | Recording magnetic field at edge of adjacent track portion |
| 65 | 1.035 | 140 | 1.070 | 215 | 1.040 |
| 75 | 0.713 | 150 | 0.701 | 225 | 0.712 |
| 80 | 0.666 | 160 | 0.667 | 240 | 0.554 |
| 88 | 0.631 | 175 | 0.624 | 263 | 0.412 |
| 100 | 0.665 | 200 | 0.665 | 300 | 0.553 |
| 125 | 0.694 | 250 | 0.738 | 400 | 0.847 |
| 200 | 0.860 | 300 | 0.839 | 450 | 0.927 |
| 250 | 0.923 | 400 | 0.949 | 500 | 0.966 |
| 300 | 0.957 | 500 | 0.994 | 600 | 0.984 |
| 400 | 0.989 | — | — | — | — |

Figure 9:
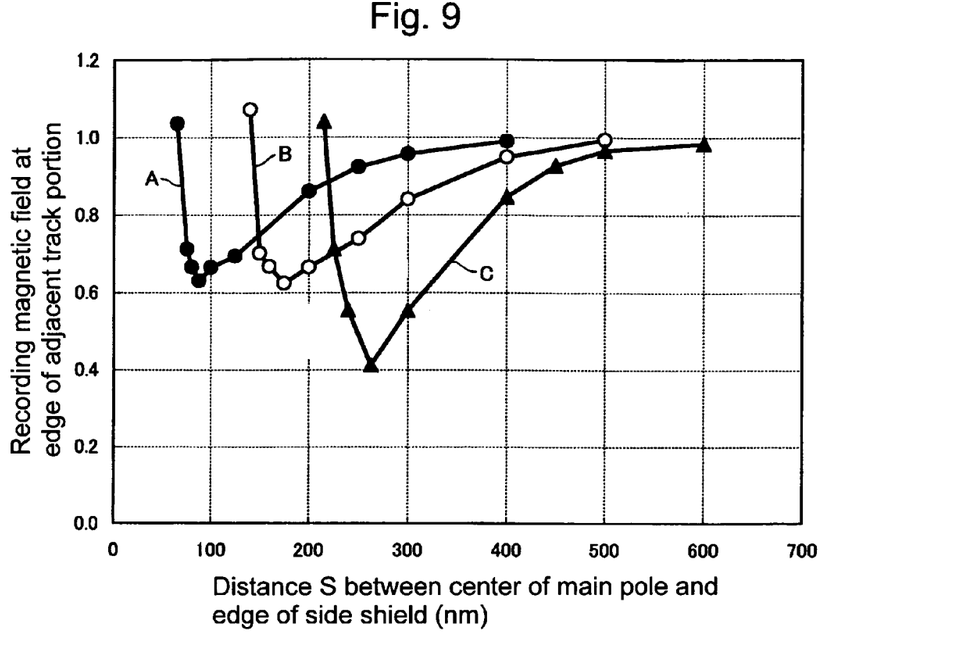
FIG. 9 is a graph showing the relationship between the position of an edge of a side shield and the magnitude of a recording magnetic field applied to an edge of a track portion adjacent to a target recording track portion in simulation example 1.

Symbols A, B, and C in FIG. 9 represent that lines labeled with these symbols are data for the simulation models A, B, and C, respectively. Furthermore, the magnitude of the recording magnetic field shown in Table 2 and FIG. 9 is a normalized value. Specifically, the magnitude of the recording magnetic field applied to the edge on the main pole 26 side of the track portion adjacent to the target recording track portion is normalized by setting to 1 the magnitude computed for another simulation model. In this simulation model, the side shields are not provided, and the other conditions are set to the same as those in the simulation example 1. It is noted that the computational results of the simulation example 1 are normalized as described above, therefore the computational results are hardly changed even when the magnetic gap between the lower surface of the main pole 26 and the upper surface of the recording layer 36 is changed within the range of, for example, 3 to 30 nm. Furthermore, even when the magnetic properties of the recording layer, the main pole, and the side shields are changed, the normalized computational results of the recording magnetic field show a tendency similar to those in the simulation example 1.

Simulation Example 2

Two simulation models D and E similar to the simulation model B in the simulation example 1 were produced except that the main pole width Pw was set to different values from that of the simulation model B as shown in Table 1. The other conditions were set to the same as those of the simulation model B.

For each of these simulation models D and E, simulations were performed, as in the above simulation example 1, by setting to a plurality of different values the distance S between the center 26A of the main pole 26 of the magnetic head 14 and the edge 28A on the main pole 26 side of each of the side shields 28. Then, the magnitude of the magnetic field applied to an edge on the main pole 26 side of a track portion adjacent to a target recording track portion was calculated.

Figure 10:
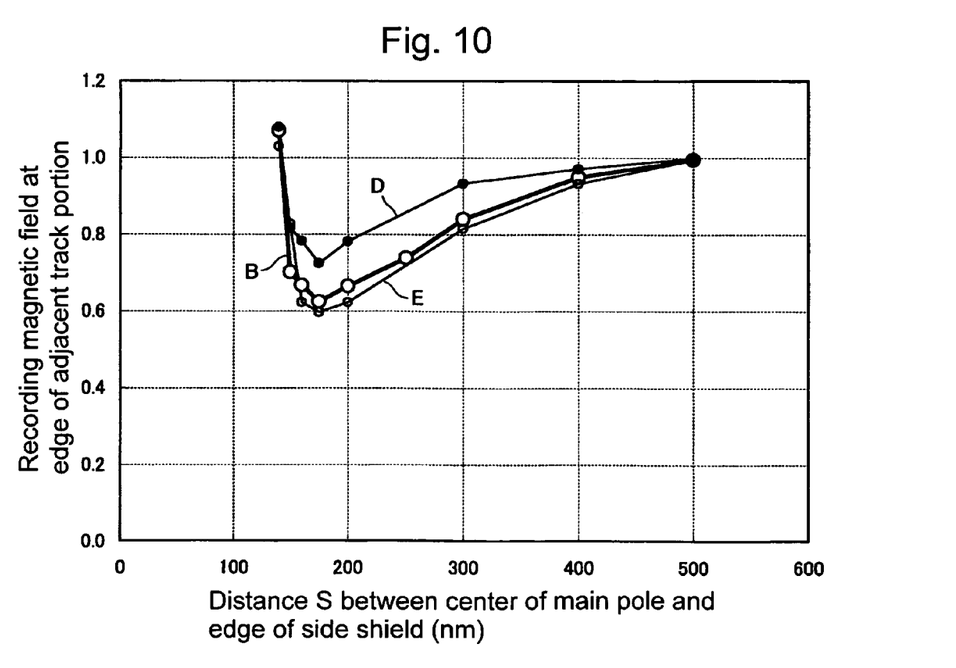
FIG. 10 is a graph showing the relationship between the position of an edge of a side shield and the magnitude of a recording magnetic field applied to an edge of a track portion adjacent to a target recording track portion in simulation example 2.

For each of the simulation models D and E, the relationship between the distance S and the magnitude of the magnetic field applied to the edge on the main pole 26 side of the track portion adjacent to the target recording track portion is shown in Table 3 and FIG. 10. The computational results for the above simulation model B are also shown in FIG. 10.

TABLE 3

| D | | E | |
|---|---|---|---|
| Distance S between center of main pole and edge of side shield (nm) | Recording magnetic field at edge of adjacent track portion | Distance S between center of main pole and edge of side shield (nm) | Recording magnetic field at edge of adjacent track portion |
| 140 | 1.080 | 140 | 1.030 |
| 150 | 0.817 | 150 | 0.827 |
| 160 | 0.783 | 160 | 0.623 |
| 175 | 0.724 | 175 | 0.596 |
| 200 | 0.782 | 200 | 0.622 |
| 300 | 0.933 | 300 | 0.815 |
| 400 | 0.971 | 400 | 0.931 |
| 500 | 0.999 | 500 | 0.994 |

Symbols B, D, and E in FIG. 10 represent that lines labeled with these symbols are data for the simulation models B, D, and E, respectively.

Simulation Example 3

In contrast to the simulation model B of the simulation example 1 in which the ratio between the track width Tw and the gap width Gw is 1:1, two simulation models F and G similar to the simulation model B were produced except that the track width Tw and the gap width Gw were set to different values each other as shown in Table 1. Note that the sum of the track width Tw and the gap width Gw corresponds to the track pitch, and the sums in the simulation models B, F, and G are the same. The other conditions were set to the same as those of the simulation model B.

For each of these simulation models F and G, simulations were performed, as in the simulation example 1 above, by setting to a plurality of different values the distance S between the center 26A of the main pole 26 of the magnetic head 14 and the edge 28A on the main pole 26 side of each of the side shields 28. Then, the magnitude of the magnetic field applied to an edge on the main pole 26 side of a track portion adjacent to a target recording track portion was calculated.

Figure 11:
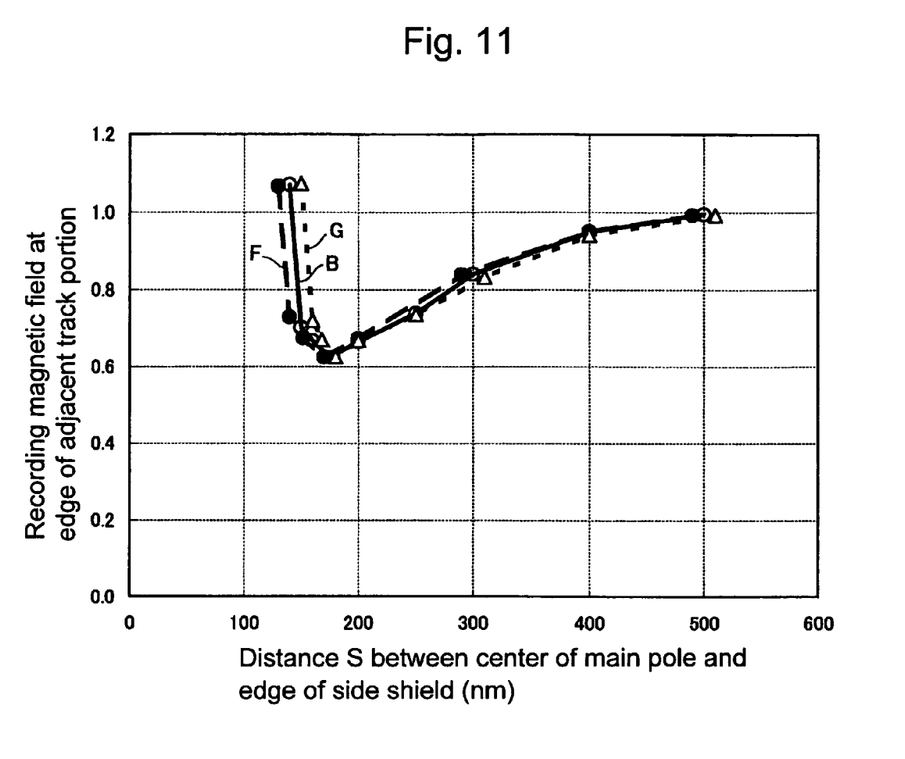
FIG. 11 is a graph showing the relationship between the position of an edge of a side shield and the magnitude of a recording magnetic field applied to an edge of a track portion adjacent to a target recording track portion in simulation example 3.

For each of the simulation models F and G, the relationship between the distance S and the magnitude of the magnetic field applied to the edge on the main pole 26 side of the track portion adjacent to the target recording track portion is shown in Table 4 and FIG. 11. The computational results for the above simulation model B are also shown in FIG. 11.

TABLE 4

| F | | G | |
|---|---|---|---|
| Distance S between center of main pole and edge of side shield (nm) | Recording magnetic field at edge of adjacent track portion | Distance S between center of main pole and edge of side shield (nm) | Recording magnetic field at edge of adjacent track portion |
| 130 | 1.066 | — | — |
| 140 | 0.728 | 150 | 1.072 |
| 152 | 0.674 | 160 | 0.719 |
| 170 | 0.624 | 168 | 0.669 |
| 200 | 0.673 | 180 | 0.625 |

TABLE 4-continued

| F | | G | |
|---|---|---|---|
| Distance S between center of main pole and edge of side shield (nm) | Recording magnetic field at edge of adjacent track portion | Distance S between center of main pole and edge of side shield (nm) | Recording magnetic field at edge of adjacent track portion |
| 290 | 0.838 | 200 | 0.668 |
| 400 | 0.950 | 250 | 0.735 |
| 490 | 0.992 | 310 | 0.832 |
| — | — | 400 | 0.941 |
| — | — | 510 | 0.992 |

Symbols B, F, and G in FIG. 11 represent that lines labeled with these symbols are data for the simulation models B, F, and G, respectively.

As shown in FIG. 9, in each of the simulation models A, B, and C, the magnitude of the recording magnetic field applied to the edge on the main pole 26 side of the track portion adjacent to the target recording track portion is at a minimum when S is a specific value. Hence, it has been found that the magnitude of this recording magnetic field increases when S is larger or smaller than that specific value.

It has been found that, in the range where S is smaller than the value giving the minimum magnitude of the recording magnetic field applied to the edge on the main pole 26 side of the track portion adjacent to the target recording track portion, the magnitude of this recording magnetic field tends to increase abruptly as S decreases beyond a certain value. It has also been found that, when S is excessively small, the magnitude of this recording magnetic field becomes larger than that in the case where the side shields are not provided (exceeds 1.0 in FIG. 9).

As described above, the magnitude of the recording magnetic field applied to the edge on the main pole 26 side of the track portion adjacent to the target recording track portion starts increasing abruptly at a certain point. The position of the edge 28A on the main pole 26 side of each of the side shields 28 which corresponds to this point is a position directly above the edge on the main pole 26 side of the track portion adjacent to the target recording track portion.

In other words, when the edge 28A on the main pole 26 side of each of the side shields 28 is located further away from the main pole 26 than a position directly above the edge on the main pole 26 side of the track portion adjacent to the target recording track portion, the effect of suppressing the recording magnetic field applied to the adjacent track portion is reliably obtained.

When the edge 28A on the main pole 26 side of each of the side shields 28 is located at a position directly above the edge on the main pole 26 side of the track portion adjacent to the target recording track portion, S equals Tw/2+Gw. Therefore, it has been found that, when $$S > Tw/2 + Gw \qquad (I)$$

is satisfied, the effect of suppressing the recording magnetic field applied to the adjacent track portion is reliably obtained.

Meanwhile, it has been found that, when S is larger than the value giving the minimum magnitude of the recording magnetic field applied to the edge on the main pole 26 side of the track portion adjacent to the target recording track portion, the magnitude of this recording magnetic field tends to converge to the value obtained when the side shields are not provided (1.0 in FIG. 9). Specifically, at the right end point on each of the curves shown in FIG. 9 (at a point where S is 400 nm, 500 nm, and 600 nm for the simulation models A, B, and C, respectively), the magnitude of this recording magnetic field almost converges to the value obtained when the side shields are not provided, and the effect of the side shields is not obtained. It has been found that S corresponding to the right end point in each of the simulation models is represented by 4/3×(Tw/2+Gw)+300 nm. Therefore, when $$S \leq 4/3 \times (Tw/2+Gw)+300 \text{ nm} \quad \text{(II)}$$

is satisfied, the effect of the side shields is obtained to a certain extent.

Furthermore, it has also been found that the clear effect of reducing the magnitude of the recording magnetic field applied to the edge on the main pole 26 side of the track portion adjacent to the target recording track portion relative to the magnitude in the case where the side shields are not provided can be obtained at a point where S is 200 nm, 300 nm, and 400 nm for the simulation models A, B, and C, respectively. It has been found that, in each of the simulation models, S corresponding to the above point is represented by 4/3×(Tw/2+Gw)+100 nm. Therefore, when $$S \leq 4/3 \times (Tw/2+Gw)+100 \text{ nm} \quad \text{(III)}$$

is satisfied, the clear effect of reducing the magnitude of the recording magnetic field applied to the edge on the main pole 26 side of the track portion adjacent to the target recording track portion can be obtained.

Moreover, it has been found that at a point where S is in the range of 80 to 100 nm, 160 to 200 nm, and 240 to 300 nm for the simulation models A, B, and C, respectively, the magnitude of the recording magnetic field applied to the edge on the main pole 26 side of the track portion adjacent to the target recording track portion is close to the minimum value. Hence, the effect of significantly reducing the magnitude of this recording magnetic field relative to the magnitude in the case where the side shields are not provided is obtained.

It has been found that, in each of the simulation models, the lower limit of S giving such an effect is represented by Tw/2+Gw+0.1×Tw=0.6×Tw+Gw. In addition to this, the upper limit of S giving such an effect is represented by Tw/2+Gw+0.5×Tw=Tw+Gw. Therefore, when the following inequalities:

$$S \geq 0.6 \times Tw+Gw, \text{ and} \quad \text{(IV)}$$

$$S \leq Tw+Gw \quad \text{(VI)}$$

are satisfied, the effect of significantly reducing the magnitude of the recording magnetic field applied to the edge on the main pole 26 side of the track portion adjacent to the target recording track portion relative to the magnitude in the case where the side shields are not provided can be obtained.

Moreover, the position of the magnetic head 14 is controlled such that the center 26A of the main pole 26 coincides with the center of the target recording track portion in the cross-track direction Dc. However, in practice, off-tracking (being the deviation of the center 26A of the main pole 26 in the cross-track direction Dc from the center of a target recording track portion) occurs repeatedly, and any off-tracking is corrected at each occurrence. Namely, off-tracking occurs intermittently.

Meanwhile, when the edge 28A on the main pole 26 side of each of the side shields 28 is located at a position directly above the edge on the main pole 26 side of the track portion adjacent to the target recording track portion, or near the main pole 26 side, the fluctuations of the recording magnetic field applied to the edge on the main pole 26 side of the adjacent track portion against the fluctuations of the position of the main pole 26 in the cross-track direction Dc are large. Hence, the recording magnetic field applied to the edge on the main pole 26 side of the adjacent track portion can become significantly large depending on the amount of off-tracking.

In view of the margin for off-tracking, it is preferable that the edge 28A on the main pole 26 side of each of the side shields 28 be away, to some extent, from a position directly above the edge on the main pole 26 side of a track portion adjacent to a target recording track portion in a direction away from the main pole 26. It is preferable also from this point to satisfy the above inequality (IV).

It is noted that FIG. 10 shows the results of simulation example 2 in which the track width Tw and the gap width Gw are constant. In this case, it has been found that, even when the main pole width Pw increases or decreases, the value of S giving the minimum magnitude of the recording magnetic field applied to the edge on the main pole 26 side of the track portion adjacent to the target recording track portion is hardly changed. In addition to this, in the range where S is smaller than the minimum, the value of S at which the magnitude of this recording magnetic field starts increasing abruptly is hardly changed.

Moreover, it has been found that, even when the main pole width Pw increases or decreases, the value of S at which the magnitude of the recording magnetic field almost converges to the value obtained when the side shields are not provided (the value of S corresponding to the right end point) is hardly changed. In addition, the upper limit of S giving the clear effect of reducing the magnitude of the recording magnetic field applied to the edge on the main pole 26 side of the track portion adjacent to the target recording track portion relative to the magnitude in the case where the side shields are not provided in the range where S is larger than the value giving the minimum magnitude of this recording magnetic field is hardly changed.

In addition to this, it has been found that, even when the main pole width Pw increases or decreases, the range of S in which the magnitude of this recording magnetic field is close to the minimum is hardly changed.

Therefore, it has been found that, when inequalities (I), (II), (III), (IV), and (VI) are satisfied, the above effect is obtained irrespective of the value of the main pole width Pw. However, it is premised that the main pole 26 is separated from each of the side shields 28 in the cross-track direction Dc.

As shown in FIG. 11, it has been found that, when the sums of the track width Tw and the gap width Gw which correspond to the track pitch are constant, the relationship between S and the magnitude of the recording magnetic field applied to the edge on the main pole 26 side of the track portion adjacent to the target recording track portion is hardly changed even when the ratios between the track width Tw and the gap width Gw are different.

As described above, though the position of the magnetic head 14 is controlled such that the center 26A of the main pole 26 is coincident with the center of a target recording track portion in the cross-track direction Dc, off-tracking (being the deviation in the cross-track direction Dc of the center 26A of the main pole 26 from the center of a target recording track portion) occurs repeatedly, and any off-tracking is corrected at each occurrence in practice. Namely, off-tracking occurs intermittently. However, even when the amount of off-tracking is at a maximum, the effect of suppressing the recording magnetic field applied to a track portion adjacent to a target recording track portion can be reliably obtained when the following inequality (VII) is satisfied:

$$S > Tw/2+Gw+Ow \quad \text{(VII)}$$

where Ow is the maximum value of the off-tracking amount. In inequality (VII), the margin for Ow is taken into consideration in the above inequality (I).

The maximum value of the off-track amount Ow is normally approximately 10% of the track pitch. Specifically, $Ow=0.1\times(Tw+Gw)$. Therefore, when the following inequality (V)

$$S > 0.6 \times Tw + 1.1 \times Gw \tag{V}$$

is satisfied, the effect of suppressing the magnetic field applied to a track portion adjacent to a target recording track portion is reliably obtained even when the amount of off-tracking is at a maximum.

The present invention is applicable to a magnetic head for recording data on a magnetic recording medium in which portions corresponding to track portions or parts thereof serve as recording areas having a width substantially the same as the track width and in which portions between the recording areas serve as non-recording areas. The invention is also applicable to a magnetic recording-reproducing apparatus provided with the magnetic recording medium and the magnetic head.

What is claimed is:

1. A magnetic recording-reproducing apparatus comprising:
    a magnetic recording medium having a track pattern formed by arranging track portions having a predetermined track width and gap portions having a predetermined gap width alternately in a cross-track direction, in which at least a part of portions corresponding to the track portions in the track pattern serve as recording areas having a width substantially the same as the track width, and in which portions between the recording areas serve as non-recording areas; and
    a magnetic head having a main pole for applying a recording magnetic field to the recording areas, and a side shield disposed on both sides of the main pole in the cross-track direction wherein following inequality (I):

$$S > Tw/2 + Gw \tag{I}$$

is satisfied, where Tw is the track width, Gw is the gap width, and S is a distance in the cross-track direction between the center of the main pole of the magnetic head in the cross-track direction and an edge on the main pole side of the side shield.

2. The magnetic recording-reproducing apparatus according to claim 1, wherein following inequality (II) is satisfied:

$$S \leq 4/3 \times (Tw/2 + Gw) + 300 \text{ nm} \tag{II}$$

3. The magnetic recording-reproducing apparatus according to claim 2, wherein following inequality (IV) is satisfied:

$$S \geq 0.6 \times Tw + Gw \tag{IV}$$

4. The magnetic recording-reproducing apparatus according to claim 2, wherein following inequality (V) is satisfied:

$$S > 0.6 \times Tw + 1.1 \times Gw \tag{V}$$

5. The magnetic recording-reproducing apparatus according to claim 2, wherein:
    the magnetic recording medium comprises a recording layer formed into a concavo-convex pattern corresponding to the track pattern;
    an area in which a convex portion of the concavo-convex pattern is formed serves as the recording area; and
    an area in which a concave portion of the concavo-convex pattern is formed serves as the non-recording area.

6. The magnetic recording-reproducing apparatus according to claim 1, wherein following inequality (III) is satisfied:

$$S \leq 4/3 \times (Tw/2 + Gw) + 100 \text{ nm} \tag{III}$$

7. The magnetic recording-reproducing apparatus according to claim 1, wherein following inequality (IV) is satisfied:

$$S \geq 0.6 \times Tw + Gw \tag{IV}$$

8. The magnetic recording-reproducing apparatus according to claim 1, wherein following inequality (V) is satisfied:

$$S > 0.6 \times Tw + 1.1 \times Gw \tag{V}$$

9. The magnetic recording-reproducing apparatus according to claim 1, wherein:
    the magnetic recording medium comprises a recording layer formed into a concavo-convex pattern corresponding to the track pattern;
    an area in which a convex portion of the concavo-convex pattern is formed serves as the recording area; and
    an area in which a concave portion of the concavo-convex pattern is formed serves as the non-recording area.

* * * * *